Dec. 3, 1946.  H. H. HANSEN  2,412,044
WELDING PRESSURE CONTROLLING APPARATUS
Filed April 13, 1944  2 Sheets-Sheet 1

Inventor
HANS H. HANSEN
By Francis J. Klempay
Attorney

Dec. 3, 1946.                H. H. HANSEN                2,412,044
                    WELDING PRESSURE CONTROLLING APPARATUS
                        Filed April 13, 1944        2 Sheets-Sheet 2

Inventor
HANS H. HANSEN

Patented Dec. 3, 1946

2,412,044

UNITED STATES PATENT OFFICE 2,412,044

WELDING PRESSURE CONTROLLING APPARATUS

Hans H. Hansen, Warren, Ohio, assignor to The Taylor-Winfield Corporation, Warren, Ohio, a corporation of Ohio Application April 13, 1944, Serial No. 530,829

5 Claims. (Cl. 219—4)

This invention relates to electric resistance welding apparatus and more particularly to improved devices for regulating or controlling the pressure applied by the welding electrodes during the welding cycle. It is now common practice to employ as an integral part of the welding machine an arrangement whereby the welding pressure applied may be rapidly increased during the welding cycle and in accurately timed relation with respect to the welding current flow. The character and uniformity of the resultant welds achieved by this double pressure method is determined principally by the accuracy of the timing of the application of the higher pressure and it is one of the principal objects of the present invention to provide an improved apparatus for shifting the welding pressure to a higher value during the welding cycle with greater speed and with greater accuracy and consistency in the timing of the application of the higher pressure.

The present invention is an improvement on the apparatus disclosed and claimed in the copending application of C. E. Smith et al., Serial No. 482,630, filed April 10, 1943, now U. S. Patent No. 2,363,753, which is assigned to the assignee of the present application. In said co-pending application the control of pressure and change in pressure is attained by employing two axially aligned bellows having a common wall mechanically connected to the movable electrode of the machine and relatively fixed outer end walls moved by a fluid pressure cylinder, the welding pressure applied being determined by the relative pressures existent in the bellows. To increase the welding pressure the bellows nearest the electrodes is exhausted. In the present improvement the bellows are replaced with flexible diaphragms which have the important advantages of requiring much less space thereby enabling the mechanism to be constructed more compactly and enabling the volume of air required to be exhausted from the lower pressure chamber to be made much smaller thereby reducing the time required for the exhaustion and lending more consistency to the timing of the application of the higher pressure.

A further object of the invention is the provision of improved means for adjusting the operation of the pressure controlling and changing apparatus whereby suitable compensation may be readily made for wear of the electrodes and variations in the thickness of the stock being welded.

Another object of the invention is the provision, in apparatus of the character described, of means for indicating the proper operation of the pressure controlling and changing assembly whereby the operation of the welding machine generally may be more efficiently monitored.

The above and other objects and advantages of the invention will become apparent upon consideration of the following detailed specification and the accompanying drawings wherein there is disclosed a preferred embodiment of the invention.

Figure 1:
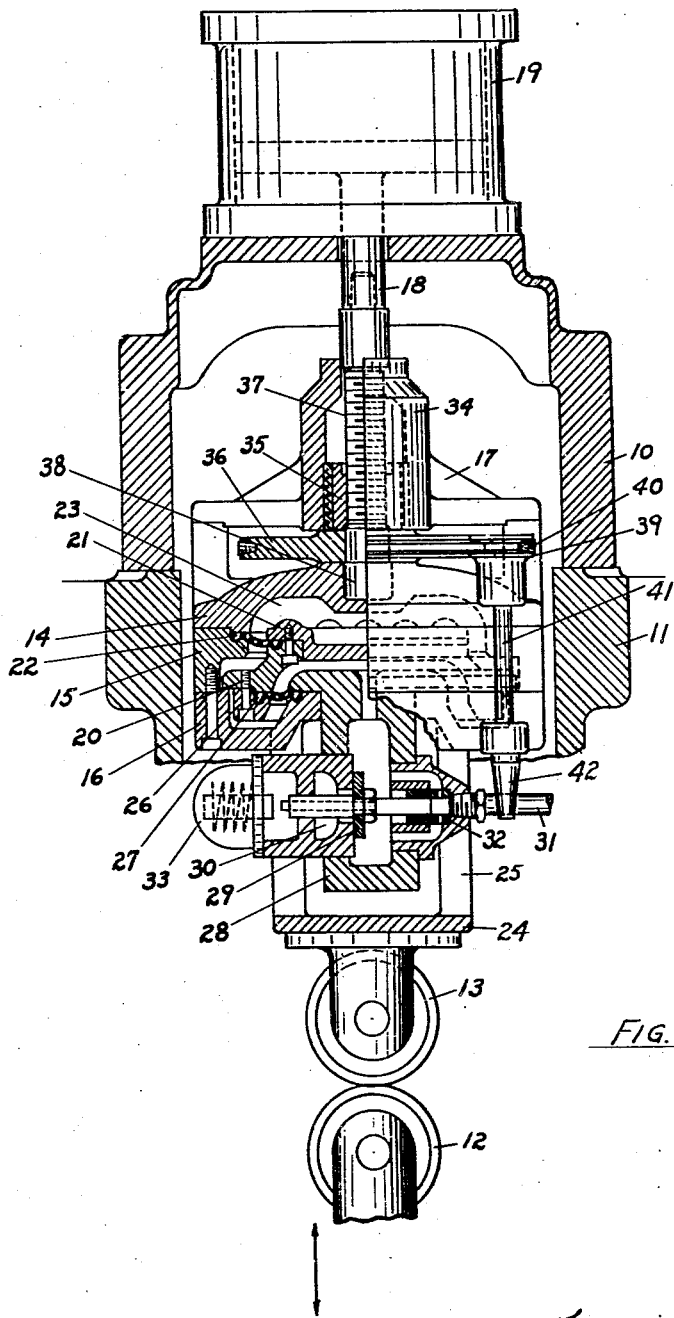
Figure 1 is a vertical section through a welding pressure controlling apparatus constructed in accordance with the principles of the invention.
Figure 2:
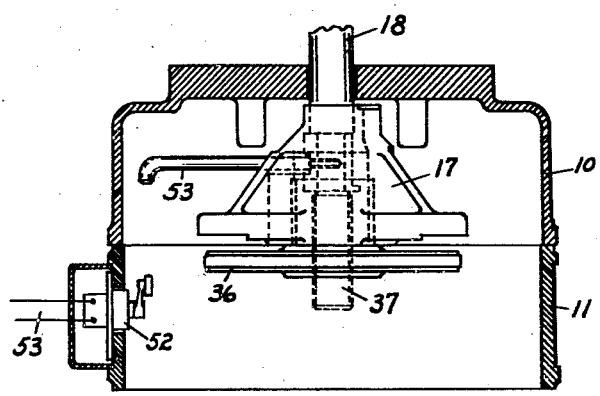
Figure 2 is a fragmentary section through a portion of the apparatus of Figure 1.

Referring to the drawings, reference numerals 10 and 11 indicate housing members fixed on the principal frame or support of the welding machine on which the apparatus herein described may be mounted and, in accordance with usual practice, such machine may be provided with a welding electrode wheel 12 which is supported for rotation about an axis normally fixed with respect to the housing or frame of the machine including the parts 10 and 11. A second wheel electrode 13 may be provided and in actual practice suitable means, not shown, is employed to drive the wheels 12 and 13 and/or to move the work to be welded between the wheels as well as to conduct welding current to the wheels as will be understood.

Slideably received in the housing provided by the parts 10 and 11 is a housing comprised of the sections 14, 15 and 16, the former being provided with a rigidly attached yoke 17 arranged to be adjustably carried by a piston rod 18 depending downwardly from a piston slideably mounted in a cylinder 19 which in turn is conveniently supported on the housing member 10. Floatingly mounted in the housing provided by the sections 14, 15 and 16 is an assembly having a ring 20 the outer peripheral edge of which is arranged to rest on an inwardly directed shoulder formed by the upper edge of the lower housing section 15 all as shown in Figure 1. Covering the opening through the ring 20 and rigidly clamped thereto is a disk 21 and clamped between the disk 21 and ring 20 is the inner edge of a flexible diaphragm ring 22, the parts being provided with suitable interlocking tongues and grooves, as shown, to securely hold the parts in assembled relation. The outer edge of the ring 22 is clamped between portions of the housing sections 14 and 15 thus providing in the section 14 a pressure chamber 23 which is normally filled with fluid under pressure.

Movable electrode 13 of the welding machine is carried by a saddle 24 having upwardly extending arms 25, the upper ends of which are joined to a ring 26 which in turn is bolted to the vertically movable ring 20. As shown in Figure 1, there is clamped between the rings 20 and 26 the outer peripheral edge of a flexible diaphragm ring 27 and the inner edge of this ring 27 is clamped between an annular surface of the housing section 16 and the flange of a member 28 which extends down through a center opening in the housing section 15. As shown, member 28 is hollow with its hollow space being in communication with the space immediately above the diaphragm 27. Located within the member 28 is a valve 29 which, when opened, provides a passageway between the space within the member 28 and an outlet port 30. A conduit 31 supplies fluid under pressure to the spaces within member 28 and above diaphragm 27 under the control of a valve 32 which closes upon opening of the valve 29. A solenoid 33 is provided to operate valves 29 and 32 in the manner more fully described in the above mentioned co-pending application.

Integral with the yoke 17 is a thimble 34 in which is journaled the hub 35 of a pulley 36. Hub 35 is interiorly threaded to have screw threaded engagement with a threaded rod 37 which is rigidly connected to the piston rod 18. As shown in Figure 1, the opening through the center of the pulley 36 and a recess 38 formed in the upper wall of the housing section 14 accommodates the lower end portion of the threaded rod 37 when the hub 35 of the pulley 36 is screwed up on the rod. This arrangement provides a ready adjustment between the positions of the carrying yoke 17 and the piston in the cylinder 19 so that the position of the operating range of movement of the electrode 13 with respect to the electrode 12 may be varied to compensate for wear of the electrodes and differences in the thickness of the stock being welded. Pulley 36 is arranged to be driven by a pulley 39 through a belt 40, the pulley 39 being keyed to a shaft 41 journaled in bearings carried by the housing sections 14 and 16 and having an exposed end 42 which may be engaged by a wheel lever or other gear, not shown, whereby the shaft 41 may be rotated and the proper adjustment made.

Figure 3:
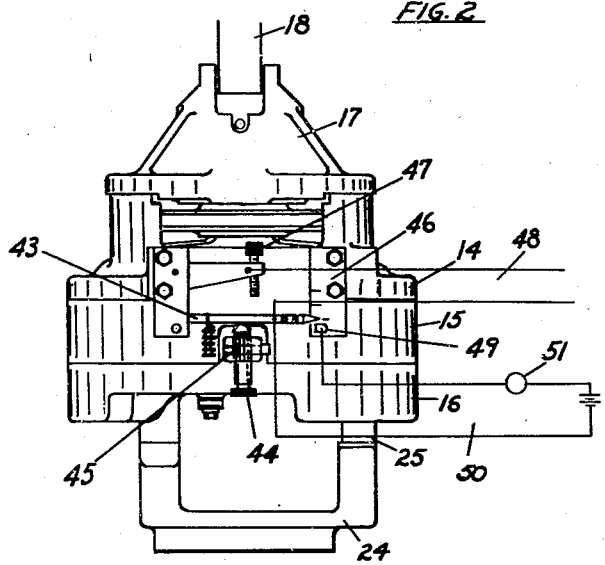
Figure 3 is a front elevation of a portion of the apparatus of Figure 1.

As shown in Figure 3, I provide a switch operating and movement indicating assembly which is responsive to movement of the ring 20 relative to the housing 14—16. Pivotally mounted on the housing is an arm 43 which is adapted to be engaged by an adjustment screw 44 which extends through and has screw-threaded connection with a boss 45 which is rigidly connected to and preferably integral with the ring 20, the housing section 15 having an opening out through which the boss 45 extends. Arm 43 is provided at its free end with a pointer overlying a scale 46 to indicate the extent of movement of the ring 20 with respect to the housing 14—16. Also carried by the housing is a rigid arm mounting a contact screw 47 which is adapted to be engaged by the lever 43 upon upward movement of the ring 20 and boss 45 relative to the housing 14—16. Upon this engagement taking place a circuit 48 is closed which circuit may be employed to reverse the flow of fluid to cylinder 19 thereby retracting the movable electrode.

I provide a contact 49 arranged to be engaged by the lever 43 when the ring 20 is in lowermost position, i. e., resting on the internal shoulder formed on the housing section 16, and when contact 49 is thus engaged a circuit 50 is closed to energize a suitable signaling device 51 to inform the operator of the fact that the ring 20 is not in floating position.

In operation, fluid, preferably air, under predetermined pressure is applied to the space 23 above the diaphragm ring 22 through a suitable port, not shown, and similarly fluid under predetermined pressure is applied to the space immediately above the diaphragm ring 27 through the conduit 31 as explained above. At the start of a cycle of operation, particularly if the assembly is used with stud electrodes for spot welding, the housing 14—16 is held in retracted or upper position by fluid pressure applied to cylinder 19 below the piston therein and upon the insertion of the work between the welding electrodes and the application of fluid pressure now to the top side of the piston and cylinder 19 the assembly 14—16 moves downwardly bringing the electrodes into pressure engagement with the work. As the pressure exerted by the cylinder 19 overcomes the pressure exerted by the fluid in the space 23 the ring 20 stops its downward movement while the housing 14—16 continues to move downwardly thus bringing the ring into floating position with respect to the housing. At this time the welding pressure exerted will be determined by the pressure exerted by the fluid in space 23 less the opposing pressure exerted by the fluid in the space immediately above the diaphragm ring 27.

To initiate the flow of welding current I provide a switch 52 carried by a part of the fixed frame of the welding machine and having an operating lever adapted to be engaged by an operating arm 53 secured to and extending outwardly from the supporting yoke 17. Upon the yoke 17 descending a predetermined distance switch 52 is closed to close a circuit 53 which is operative, through suitable devices, to initiate the flow of welding current. The various parts of the apparatus are so adjusted that the switch 52 closes while the ring 20 is floating between the shoulders formed on the housing sections 16 and 15. At a predetermined time following the application of the welding current, as determined by the setting of a timing circuit normally employed in welding machines of the kind herein involved, solenoid 33 is energized to rapidly release the pressure in the chamber immediately above the diaphragm ring 27 thereby withdrawing the opposing force and enabling the full pressure exerted by the fluid in space 23 to be applied to the electrodes. In this manner an accurately timed heavier pressure may be applied to the work during the welding cycle.

While I have illustrated the invention as applied to a seam welder employing wheel or roller electrodes, it should be understood that the invention is equally applicable in any other specific type of electric resistance welding machines. Thus stud or die electrodes, for example, may be employed in place of the wheel or roller electrodes shown. When the invention is incorporated in a seam welding machine of the automatic repeating type the piston in cylinder 19 is, of course, held in lowermost position and the switch 52 held closed thereby maintaining circuit 53 conditioned for recurrent applications of the welding "shots" which normally are synchronized with the movement of the work between the roller electrodes. At the time of application of the welding current the spaces above diaphragms 22 and 27 are both filled with fluid under pressure and subsequently solenoid 33 exhausts the lower chamber to apply the higher pressure as explained above. Before the next application of current solenoid 33 is de-energized to again build up the fluid pressure in the chamber above diaphragm 27.

If the electrodes should wear down appreciably or if the stock being welded should become so thin that the ring 29 does not "float" during the actual welding cycles the signal 51 will remain or become energized thus informing the operator for the need of adjustment which may be readily accomplished by rotating the shaft 42 to move the diaphragm assembly downwardly. During normal seam welding the signal 51 remains de-energized while during individual spot or projection welding accompanied by reciprocation of the diaphragm assembly signal 51 is normally energized but should become de-energized during the actual welding cycle, i. e., during the flow of welding current. When the machine is utilized in the latter manner the parts 35—37 are so adjusted that the piston in cylinder 19 and consequently the housing 14—16 can descend sufficiently to close circuit 48 which, as explained above, reverses the pressure in cylinder 19 to automatically retract the diaphragm assembly and the upper electrode upon the completion of the welding cycle.

It should now be apparent that I have provided improved welding pressure controlling and changing apparatus which accomplishes the objects initially set out. The diaphragms 22 and 27 while offering ample flexibility and range of movement require little space in either direction thus enabling the assembly to be built more compactly. Further, and of greater advantage is the fact that the pressure chamber exhausted with each of the diaphragms can be made of substantially less volume so that the volume of air required to be exhausted in effecting the welding pressure change is a minimum thus enabling greater speed and more consistency to be attained in this phase of the cycle of operation. It follows, also, that the machine will consume less compressed air or other fluid used. The signalling and indicating devices materially assist the operator in monitoring operation of the machine thereby insuring continued proper operation of the machine and consistent welds.

Since many changes may be made in the specific embodiment of the invention illustrated and described above without departing from the spirit or scope of the invention, reference should be had to the appended claims in determining the scope of the invention.

What I claim is:

1. In electric resistance welding apparatus; means to apply welding pressure comprising in combination a welding electrode support, a movable disk-like wall rigidly connected to said support, a housing enclosing said wall and movable with respect thereto in a direction toward and away from the welding electrodes, a flexible diaphragm ring having its outer edge secured to the side wall of said housing and its inner edge secured to said wall to define an expansible pressure chamber immediately above said wall, and a second diaphragm ring having its outer edge secured to said wall and its inner edge secured to the bottom wall of said housing to define a second pressure chamber immediately below said wall whereby the welding pressure applied is the resultant of the opposing pressures exerted by the fluid pressures in the respective pressure chambers.

2. In electric resistance welding apparatus; means to apply welding pressure comprising in combination a housing supporting one of the electrodes of the welding apparatus, means to move said housing toward and away from the other electrode of said apparatus, a wall mounted for limited floating movement in said housing and having rigid connection with said first mentioned electrode, a flexible diaphragm ring having its outer edge secured to the side walls of said housing and its inner edge secured to said wall to define an expansible pressure chamber immediately above said wall, and a second diaphragm ring having its outer edge secured to said wall and its inner edge secured to the bottom wall of said housing to define a second pressure chamber immediately below said first mentioned wall whereby the welding pressure applied is the resultant of the pressure exerted by the fluid under pressure contained in the respective pressure chambers.

3. Electric resistance welding apparatus comprising in combination a normally fixed electrode, a movable electrode, a diaphragm having its yieldable portion rigidly connected to said movable electrode and its fixed portion rigidly connected to the wall of the housing defining pressure chambers on opposite sides of said diaphragm whereby the welding pressure applied is the resultant of the pressure exerted on said diaphragm by the fluid in the respective pressure chambers.

4. Apparatus according to claim 3 further including means to move said housing toward said normally fixed electrode, means to adjustably limit the movement of said housing in a direction toward said normally fixed electrode, and means positioned outside of said housing to indicate the position of said yieldable part of said diaphragm relative to said housing.

5. In electric resistance welding apparatus having a normally fixed welding electrode and a movable electrode the combination of a fluid-tight housing, means to move said housing toward and away from said fixed electrode, means to limit the movement of said housing in a direction toward said fixed electrode, a diaphragm in said housing dividing the same into upper and lower pressure chambers, means rigidly connecting said movable electrode to a yieldable portion of said diaphragm, and valve means operative to alternately admit and discharge fluid under pressure to and from the pressure chamber below said diaphragm whereby the welding pressure may be raised and lowered while said housing is in lowermost position.

HANS H. HANSEN.